United States Patent [19]

Vanderspurt et al.

[11] Patent Number: 4,499,204

[45] Date of Patent: Feb. 12, 1985

[54] LEACHED CATALYST FOR AMMONIA SYNTHESIS

[75] Inventors: Thomas H. Vanderspurt, Stockton; Michael A. Richard, Fanwood; Angelo A. Montagna, Summit, all of N.J.

[73] Assignee: Exxon Research & Engineering Co., Florham Park, N.J.

[21] Appl. No.: 567,659

[22] Filed: Jan. 3, 1984

[51] Int. Cl.³ .............................................. B01J 25/00
[52] U.S. Cl. .................................... 502/301; 502/325; 502/328; 502/330; 502/335; 502/336; 423/363
[58] Field of Search .............. 502/301, 325, 328, 330, 502/336, 335; 423/362, 363

[56] References Cited

U.S. PATENT DOCUMENTS

| | | | |
|---|---|---|---|
| 1,476,283 | 12/1923 | Cederberg | 423/363 |
| 3,243,386 | 3/1966 | Nielsen et al. | 502/328 |
| 3,809,658 | 5/1974 | Csürös et al. | 502/301 |

*Primary Examiner*—W. J. Shine
*Attorney, Agent, or Firm*—Henry E. Naylor

[57] ABSTRACT

An improved catalyst for the synthesis of ammonia is described wherein a promoted iron-derived, pre-reduced catalyst is oxidatively leached with a neutral aqueous solution of potassium cyanide. Preferably an organic carboxylic acid such as citric acid is added to the aqueous solution to maintain the pH at about neutral. The resulting leached catalyst has a markedly higher activity than the unleached catalyst. The leached catalyst may be contacted with a cobalt complex or a nickel salt to incorporate cobalt or nickel therein which catalysts are also useful for ammonia synthesis.

14 Claims, No Drawings

LEACHED CATALYST FOR AMMONIA SYNTHESIS

BACKGROUND OF THE INVENTION AND PRIOR ART

This invention is concerned with an improved iron-based catalyst for synthesizing ammonia from hydrogen and nitrogen.

Iron-based ammonia synthesis catalysts in the oxidized state commonly comprise a reducible iron oxide, usually magnetite ($Fe_3O_4$), and lesser amounts of oxides of alkali metals, alkaline earth metals and oxides of Group III metals, which are not readily reducible. Such difficultly reducible oxides are called promoters and include for example potassium oxide, calcium oxide, beryllium oxide, magnesium oxide, lanthanum oxide, silica, thorium oxide, cesium oxide and alumina. Catalysts are doubly promoted if they contain two promoters, commonly $K_2O$ and $Al_2O_3$; triply promoted if they contain three promoters, commonly $K_2O$, $CaO$, and $Al_2O_3$; and more highly promoted for higher combinations. Prior to the catalyst's use in ammonia synthesis it is reduced to convert it to the active state by chemical reduction in a converter wherein the catalyst in the oxide form is contacted with hydrogen or a mixture of hydrogen and nitrogen or ammonia gas. The iron oxide is chemically reduced to iron while the promoters remain virtually unchanged. The promoters, during reduction, reduce the rate of growth of the iron crystals and change the electronic state of iron and its chemisorptive properties for nitrogen.

In the past, acid treatments have been described for leaching out selected portions or constituents of catalysts and catalyst supports. For example, it is known in the art to treat ceramic support materials for catalysts with concentrated acids for the control of the depth of penetration of the catalytically active materials. Similarly, it is known to treat alkali metal-containing alumina support materials with a dilute acid or acid salt to neutralize the alkali metal cations which are not tied-up in the alumina crystallites of the support prior to impregnation with a catalyst such as Pt, Fe, etc. (see U.S. Pat. No. 4,051,072).

In U.S. Pat. No. 4,040,981, a process for producing a denitrating catalyst is described in which the surface of an unactivated metal is plated with aluminum and the resulting layered product is immersed in an aluminum-dissolving solution consisting of an aqueous solution of acid or alkali, e.g. hydrofluoric acid, nitric acid, mineral acids, acetic acid, formic acid and like organic acids to dissolve out the aluminum and activate the surface of the metal.

Further, U.S. Pat. No. 1,926,099 describes the treatment of base exchanged bodies or catalysts with acids such as mineral acids which bodies or catalysts have a nucleus or ion exchangeable portion containing a basic metal oxide, an acid oxide and an exchangeable base portion. The acid treatment removes part or all of the exchangeable bases and also part or all of the basic portion of the nucleus. The basic metals of the nucleus include copper, aluminum, iron and cobalt and the acid portion of the nucleus includes alkali metal silicates and alkali metal salts of acids. The exchangeable bases may be specific catalysts, stabilizers or promoters. Leached non-silicious base exchange bodies, either partially or completely leached, may contain catalytically active components and behave as catalysts, stabilizer promoters or both.

The present invention provides an improved iron-based catalyst for ammonia synthesis formed by leaching a promoted iron based catalyst with a complexing agent under oxidizing conditions to increase the porosity of the pre-leached catalyst. The activity of the catalyst is dramatically improved over the pre-leached catalyst.

In another embodiment of the invention, the leached catalyst is treated with a cobalt complex or salt to incorporate cobalt therein.

In still another embodiment of the invention, the leached catalyst is treated with a nickel salt to incorporate nickel therein. Both the cobalt and nickel incorporated catalysts are useful in ammonia synthesis.

SUMMARY OF THE INVENTION

The improved catalyst of this invention consists of an oxidatively leached iron-based catalyst in pre-reduced form in which the leaching agent is an alkali metal cyanide in aqueous solution. The leaching is preferably carried out at about neutral pH and an organic carboxylic acid such as citric acid is preferably employed to control the pH. In preparing the improved catalyst a pre-reduced iron-based catalyst containing iron and one or more promoters such a alkali metal oxides, alkaline earth metal oxides and Group III oxides such as alumina are combined with an aqueous, basic solution of an alkali metal cyanide such as potassium cyanide to form a slurry. A solution of the organic carboxylic acid is added to the slurry to reduce the pH of the basic cyanide solution to about neutral. Thereafter the slurry is blanketed with an oxygen-containing gas such as a mixture of oxygen and nitrogen and allowed to react for from 3 to 12 hours during which time portions of the iron and promoters are leached out. The iron is removed by oxidative leaching, the rate of which can be adjusted to some extent by varying the oxygen level in the blanketing gases. Thereafter the catalyst is separated from the slurry, washed and dried. It can then be reduced to convert any iron oxide to iron under an atmosphere of $H_2$ and $N_2$ in a converter as well-known in the art. The resulting leached, pre-reduced catalyst contains additional porosity and has markedly higher activity for ammonia synthesis than the unleached pre-reduced catalyst.

In other embodiments of the invention the leached catalyst is contacted with a soluble cobalt salt or complex of cobalt to incorporate cobalt therein or a nickel salt to incorporate nickel therein. Enough cobalt or nickel salt is contacted with the leached catalyst such that about 10% of the catalyst surface area will be covered. Other promoters may also be added including but not limited to salts and oxides of potassium, rubidium, cesium, magnesium, ruthenium, strontium, and transition metal carbonyls and alkali metal salts of transition metal carbonyls. Of course, promoters of the type already initially present in the catalyst such as Ca may be added so as to control their concentration in the final, leached and dried material.

DETAILED DESCRIPTION OF THE PREFERRED EMBODIMENTS

The improved catalysts prepared according to the invention are iron oxide-derived catalysts, the iron being present mainly as α-Fe which in the reduced catalyst is promoted with one or more oxides of alkali metals, alkaline earth metals and oxides of Group III metals, particularly aluminum. These catalysts are particularly useful for ammonia synthesis from the component gases $H_2$ and $N_2$ and may also be used to catalyze carbon monoxide hydrogenation reactions and constitute improvements over conventional ammonia synthesis catalysts by virtue of their increased active metal surface area.

This increased active metal surface area is obtained by oxidative leaching of a portion of the iron and promoters from a pre-reduced catalyst containing the same constituents. The pre-reduced catalyst is also preferably passivated by cooling it to or near room temperature after reduction and exposing it to low partial pressures of oxygen in inert gas such that only a thin surface oxide layer is formed. The bulk of the iron is still in the reduced state, however. One such pre-reduced and passivated catalyst is HALDOR-TOPSOE KMIR (Haldor Topsoe) containing by weight about 95% Fe, 2% $Al_2O_3$, 1½% $K_2O$ and 1½% CaO with traces of MgO and $SiO_2$.

Oxidative leaching is the reaction between iron and oxygen in the presence of a complexing agent which holds the ferrous ($Fe^{+2}$) or ferric ions ($Fe^{+3}$) formed in solution. There is an equilibrium established between the various chemical species in solution. Example reactions are given below.

(a) Formation of alkali metal hexacyanoferrate(II) in solution:

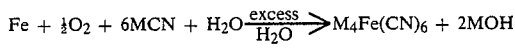

where M = Li, Na, K, Rb or Cs.

(b) Formation of alkali metal hexacyanoferrate(III) in solution.

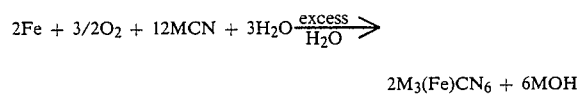

(c) Removal of surface Fe oxides:

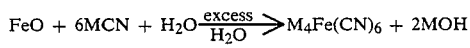

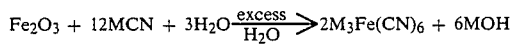

The cyanide ion is a very good complexing agent for $Fe^{+2}$ or $Fe^{+3}$ but not for $Ca^{+2}$, $Mg^{+2}$ or $Al^{+3}$. $Ca^{+2}$ and $Mg^{+2}$ as found in the pre-reduced and passivated catalyst may go into solution as other complexes for example citrates or other salts depending on such variables as the temperature and pH of the leaching solution as well as the concentration of the various organic acid species in solution.

The catalyst according to the invention is preferably prepared by first combining crushed pre-reduced and passivated catalyst with distilled water and adjusting the pH to between about 6 and 7 with an organic carboxylic acid to form a slurry. The organic carboxylic acids used herein are water soluble organic carboxylic acids free of known catalyst poisons such as sulfur, or halogens which do not form insoluble salts with iron or the other components leached from the pre-reduced and passivated catalyst under the leaching conditions. Complexing water-soluble hydroxycarboxylic acids such as citric and tartaric acids are preferred. Oxalic, acetic or formic acid may also be used. Strong mineral acids such as nitric acid are to be avoided because of the possibility of liberating toxic HCN gas. To the slurry formed from the pre-reduced catalyst and organic carboxylic acid is added a basic aqueous solution of an alkali metal cyanide such as potassium cyanide having a pH of about 12. Other alkali metal cyanides such as lithium, sodium, rubidium or cesium cyanide may also be employed. Potassium cyanide is preferred due to its effectiveness, availability and cost. The pH of the slurry is adjusted down to about neutral again with additional organic carboxylic acid solution and leaching is allowed to take place. During the leaching process additional acid is added periodically to counteract the rise in pH as a consequence of the leaching reaction. The oxidative leaching of the pre-reduced and passivated catalyst can take place at basic pH's, that is, without maintaining the slurry at about neutral pH with the organic carboxylic acid. However such treatment with organic acid is preferred because it neutralizes the MOH species formed in reactions (a) (b) & (c) above thereby promoting the additional formation of cyanoferrate complexes.

A blanket of an oxygen-containing gas is maintained over or baffled through the reaction zone to promote the oxidative leaching at temperatures of 100° or less and at pressures of 1 ATM or less. Such oxygen-containing gases can include oxygen, a mixture of oxygen and nitrogen, air and ozone. The oxidative leaching according to the invention can also be carried out in the presence of oxidants such as peracids, peroxides or other agents containing active oxygen dissolved in the leaching solution or slurry. However due to considerations of safety and control of reaction, oxygen-containing gases are preferred.

After leaching is allowed to occur, usually for from 8 to 12 hours at from room temperature up to 100° C. and at neutral to slightly basic pH, a solution is formed primarily containing potassium ferricyanide complexes, potassium cyanide and carboxylates (e.g. citrates if citric acid is used as the organic carboxylic acid). This solution is separated from the leached catalyst and the catalyst is dried. The catalyst is then reduced in a hydrogen-nitrogen atmosphere in a converter. The original pre-reduced and passivated catalyst has removed therefrom a portion of the iron and a portion of the promters.

Generally the leaching is carried out so that in the final leached catalyst from about 2% to about 10% of the total iron by weight has been removed. This corresponds to about a 10% to 30% increase in surface area over the pre-leached catalyst. To accomplish this degree of leaching and increase in catalyst surface area, a minimum of about 6 moles of alkali metal cyanide per mole of iron to be removed is required and preferably about 12 to 18 moles of alkali metal cyanide per mole of iron to be removed or at least 0.1 mole of alkali metal cyanide per mole of total iron in the catalyst and preferably from about 0.5 to 1 mole of alkali metal cyanide per mole of total iron.

It has been found that the leached catalyst according to the invention exhibits a markedly improved activity, depending on temperature, than the unleached pre-reduced catalyst when used in the synthesis of ammonia, primarily due to the increased metal surface area.

The leached catalyst according to the invention, can be contacted with a solution of a cobalt complex such as $K_4Co(CN)_6$ or a cobalt salt such as cobalt acetate in an amount to cover about 10% of the catalyst surface and dried to incorporate cobalt. Similarly a nickel salt such as nickel acetate in solution can be contacted with the catalyst to incorporate nickel therein. Such cobalt and nickel-containing catalysts are also useful as ammonia synthesis catalysts.

In order to more completely describe the present invention the following examples are given.

EXAMPLE 1

This Example describes the preparation of an improved catalyst according to the invention by oxidatively leaching an iron-derived catalyst in pre-reduced and passivated form.

About 50 grams of 20-40 mesh Haldor-Topsoe KMIR (Haldor Topsoe Co.) triply promoted $NH_3$ synthesis catalyst (pre-reduced and passivated) containing about 95% α-Fe, 2% $Al_2O_3$, 1½% $K_2O$ and 1½% CaO and trace amounts of MgO and SiO was placed in a 1000 ml. round bottomed flask equipped with an air powdered stirrer followed by 300 ml. of doubly distilled $H_2O$. The pH was adjusted to 5.8 through the dropwise addition of 1 molar citric acid solution. Then 100 ml. $H_2O$ containing 16.0 grams KCN (pH 12) was introduced dropwise. During addition of the KCN solution the pH was adjusted periodically to about 7.0 with 1.0 molar citric acid solution to counteract the rise in pH due to the oxidative leaching reaction. The solution was blanketed with $O_2$ and stirred overnight. The total amount of citric acid added was 0.1 moles, 19.2 grams. The resulting solution (pH 7.6) containing cyano iron complexes, free cyanide and citrates was decanted and the catalyst washed three times with water; 75 ml., 75 ml. and 50 ml. aliquots. The solid was dried at 50° C. in a vacuum oven. Exactly 15.35 grams of the leached catalyst with a volume of 7.5 cm$^3$ was blended with 7.5 cm$^3$, 8.57 grams, of 20-40 mesh crushed fused quartz. The resulting mixture was charged into a standard 0.5 inch O.D., 0.375" I.D. reactor tube equipped with a 0.0625 O.D. axial thermowell. The catalyst was reduced carefully first at about 1 atm then at about 42 atm under $3H_2/1N_2$ at about 15,000 GHSV (gas hourly space velocity).

EXAMPLE 2

In this Example, samples of the leached catalyst prepared in Example 1 were used in a number of experiments for synthesizing ammonia from hydrogen and nitrogen gases at temperatures ranging from 360° C. (691° F.) to 419° C. (786° F.) at a space velocity of about 5000 and a pressure of 617.2 psig. In the experiments (Nos. 1-11) the leached catalyst employed had been reduced at a maximuum temperature of 475° C. in an atmosphere containing 3 moles $H_2$ to 1 mole $N_2$.

Table 1 below lists the space time yield for each experiment.

TABLE 1

| Exp. No. | T (°F.) | Mole % Composition At Vent | | | Inlet Composition Mole % | | Space/Time/ Yield (g/l hour) |
|---|---|---|---|---|---|---|---|
| | | $H_2$ | $N_2$ | $NH_3$ | $H_2$ | $N_2$ | |
| 1 | 786 | 69.17 | 21.67 | 9.19 | 76.14 | 23.86 | 298 |
| 2 | 774 | 69.16 | 21.60 | 9.24 | 76.20 | 23.80 | 299 |
| 3 | 756 | 69.42 | 21.53 | 9.05 | 76.33 | 23.67 | 293 |
| 4 | 734 | 70.03 | 21.44 | 8.53 | 76.56 | 23.44 | 278 |
| 5 | 716 | 70.41 | 21.58 | 8.01 | 76.54 | 23.46 | 262 |
| 6 | 788 | 45.78 | 46.32 | 7.90 | 49.71 | 50.29 | 259 |
| 7 | 772 | 45.78 | 46.23 | 7.99 | 49.76 | 50.24 | 261 |
| 8 | 752 | 45.79 | 46.28 | 7.93 | 49.73 | 50.27 | 260 |
| 9 | 736 | 46.06 | 46.26 | 7.68 | 49.89 | 50.11 | 252 |
| 10 | 716 | 46.53 | 46.21 | 7.26 | 49.83 | 50.17 | 240 |
| 11 | 691 | 47.18 | 46.19 | 6.64 | 49.47 | 50.53 | 220 |

EXAMPLE 3

In this Example a series of experiments (Nos. 12 to 22) were conducted similar to those of Example 2 but using the untreated, pre-reduced, passivated catalyst (KMIR) which had been reduced at 480° C. using a mole ratio of hydrogen to nitrogen of 3/1. The space time yields of this catalyst at various temperatures are given in Table 2 below.

TABLE 2

| Exp. No. | T (°F.) | $H_2/N_2$ Ratio | Space Time Yield (g/l hour) |
|---|---|---|---|
| 12 | 606 | 3 | 110 |
| 13 | 658 | 3 | 148 |
| 14 | 711 | 3 | 181 |
| 15 | 754 | 3 | 207 |
| 16 | 806 | 3 | 222 |
| 17 | 792 | 1 | 178 |
| 18 | 775 | 1 | 176 |
| 19 | 757 | 1 | 172 |
| 20 | 730 | 1 | 163 |
| 21 | 714 | 1 | 155 |
| 22 | 687 | 1 | 141 |

A comparison of catalyst activity at various temperatures (°F.) between Experiments 1 to 11 and Experiments 12 to 22 was made. As shown in Table 3, the leached catalyst was shown to have improved activities of at least 42% over the unleached catalyst based on a comparison of space time yields.

TABLE 3

| Example 2 | | Example 3 | | |
|---|---|---|---|---|
| Temp. (°F.) | Space Time Yield | Temp. (°F.) | Space Time Yield | % Improvement |
| 756 | 293 | 754 | 207 | 42 |
| 788 | 259 | 792 | 178 | 46 |
| 716 | 240 | 714 | 155 | 55 |
| 691 | 220 | 687 | 141 | 56 |

EXAMPLE 4

In this Example, the leached catalyst formed in Example 1 prior to reduction was contacted with a solution of $K_4Co(CN)_6$ so that approximately 10% of the catalyst surface area would be covered with the cobalt complex and the catalyst was dried. The resulting cobalt substituted catalyst is useful as an ammonia synthesis catalyst.

EXAMPLE 5

The leached catalyst of Example 1 prior to reduction is contacted with a solution of nickel acetate so that approximately 10% of the catalyst surface area will be covered with the nickel salt and the catalyst is thereafter dried. The resulting nickel substituted catalyst can be used as an ammonia synthesis catalyst.

EXAMPLE 6

A 40-60 mesh Haldor-Topsoe KMIR pre-reduced and passivated catalyst was treated under $N_2$ with a 10% solution of KCN in high purity distilled water. The solution was stirred rapidly and sufficient air was introduced to the $N_2$ stream to yield about 1% $O_2/N_2$. The amount of air added was controlled to equal about 1% of the iron in the catalyst (on a molar basis) per hour. This mode of operation was continued for a total of 24 hr. with stirring. Sufficient $KHCO_3$ as a buffering agent and KCN was present to allow the formation of $K_4Fe(CN)_6$. After leaching the catalyst was washed with volumes of oxygen free distilled water under $N_2$. The material was then contacted with a solution of $K_4Co(CN)_6$ and dried; enough $K_4Co(CN)_6$ was added such that approximately 10% of the catalyst surface area would be covered assuming the Co complex is totally dispersed. The cobalt containing catalyst is useful as an ammonia synthesis catalyst.

What is claimed is:

1. An improved catalyst formed by leaching a pre-reduced catalyst containing iron and one or more promoters selected from the group consisting of an alkali metal oxide, an alkaline earth metal oxide and aluminum oxide in an aqueous medium with an alkali metal cyanide under oxidative conditions.

2. The improved catalyst of claim 1 wherein the pH of said aqueous medium is adjusted to about 7 by use of a water soluble organic carboxylic acid.

3. The improved catalyst of claim 1 wherein said oxidative conditions comprises a blanket of an oxygen-containing gas over said aqueous medium.

4. The improved catalyst of claim 1 which is further treated with a cobalt complex or salt to incorporate cobalt therein.

5. The improved catalyst of claim 1 which is further treated with a nickel salt to incorporate nickel therein.

6. A leached catalyst formed by:
    (a) combining a pre-reduced catalyst containing iron and at least one promoter selected from the group consisting of an alkali metal oxide, an alkaline earth metal oxide and aluminum oxide, with a solution of an alkali metal cyanide to form a slurry;
    (b) adding to said slurry a solution of an organic carboxylic acid until the pH of said slurry is about 7;
    (c) leaching said pre-reduced catalyst in the presence of an oxygen-containing gas to remove a portion of said iron and promoters and to form a leached catalyst; and
    (d) separating said leached catalyst from said slurry.

7. The catalyst of claim 6 which further comprises maintaining the pH of said slurry at about neutral during leaching with said organic carboxylic acid.

8. The leached catalyst of claim 6 wherein said pre-reduced catalyst is passivated.

9. The catalyst of claim 6 which is further treated with a cobalt complex to incorporate cobalt therein.

10. The catalyst of claim 6 which is further treated with a nickel salt to incorporate nickel therein.

11. The leached catalyst of claim 6 wherein said organic carboxylic acid is a hydroxycarboxylic acid.

12. A leached catalyst formed by:
    (a) combining a pre-reduced and passivated catalyst containing iron, alumina, potassium oxide and calcium oxide with a solution of potassium cyanide to form a slurry;
    (b) adding to said slurry a solution of citric acid until the pH of said slurry is about 7;
    (c) leaching said catalyst at about neutral pH in the presence of an oxygen-containing gas to remove a portion of said iron and promoters and to form a leached catalyst; and
    (d) separating said leached catalyst from said slurry.

13. The catalyst of claim 12 which further comprises treating said improved catalyst with a cobalt complex or salt to incorporate cobalt therein.

14. The catalyst of claim 12 which further comprises treating said improved catalyst with a nickel salt to incorporate nickel therein.

* * * * *